Figure 1:
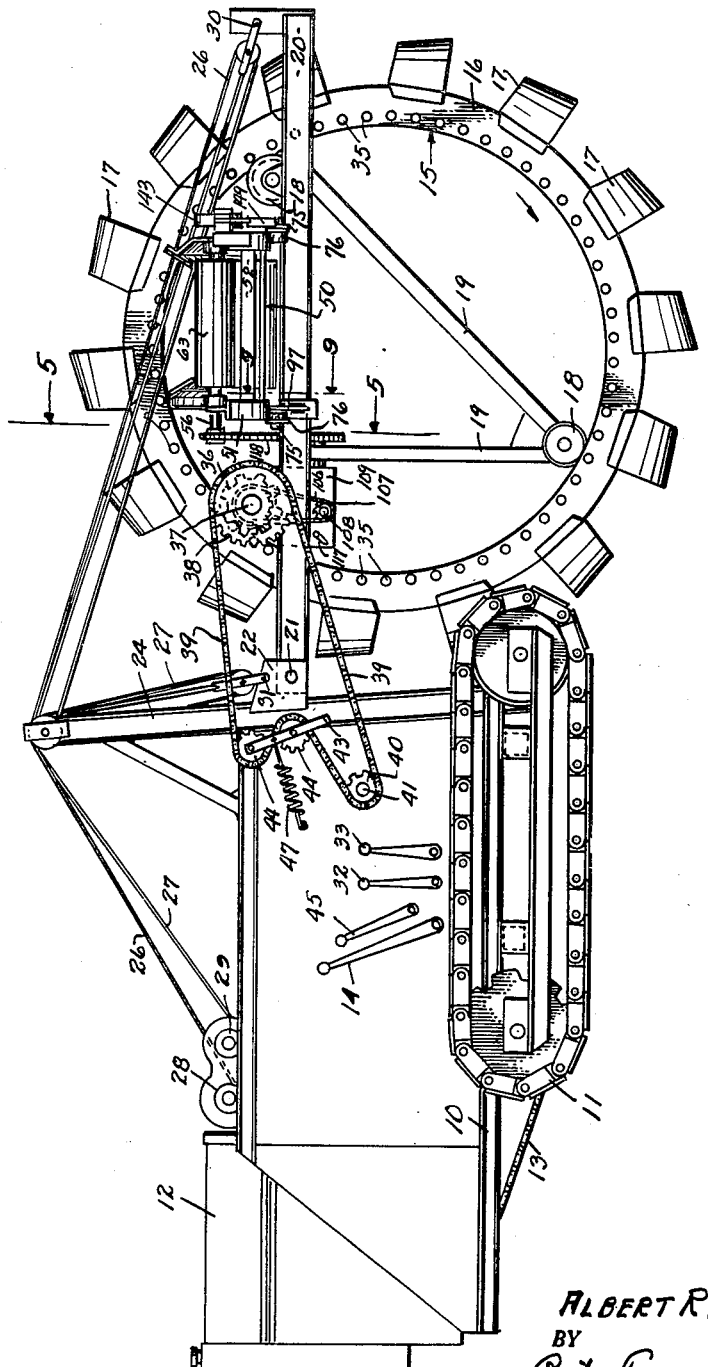

May 27, 1952 — A. R. ASKUE — 2,598,339
DISCHARGE CONVEYER FOR EXCAVATING MACHINES
Filed July 22, 1949 — 5 Sheets-Sheet 1

INVENTOR.
ALBERT R. ASKUE
BY
Bates, Teare + McDean
ATTORNEYS

May 27, 1952  A. R. ASKUE  2,598,339
DISCHARGE CONVEYER FOR EXCAVATING MACHINES
Filed July 22, 1949  5 Sheets-Sheet 2

INVENTOR.
ALBERT R. ASKUE
BY
Bates, Teare & McBean
ATTORNEYS

May 27, 1952 A. R. ASKUE 2,598,339
DISCHARGE CONVEYER FOR EXCAVATING MACHINES
Filed July 22, 1949 5 Sheets-Sheet 3
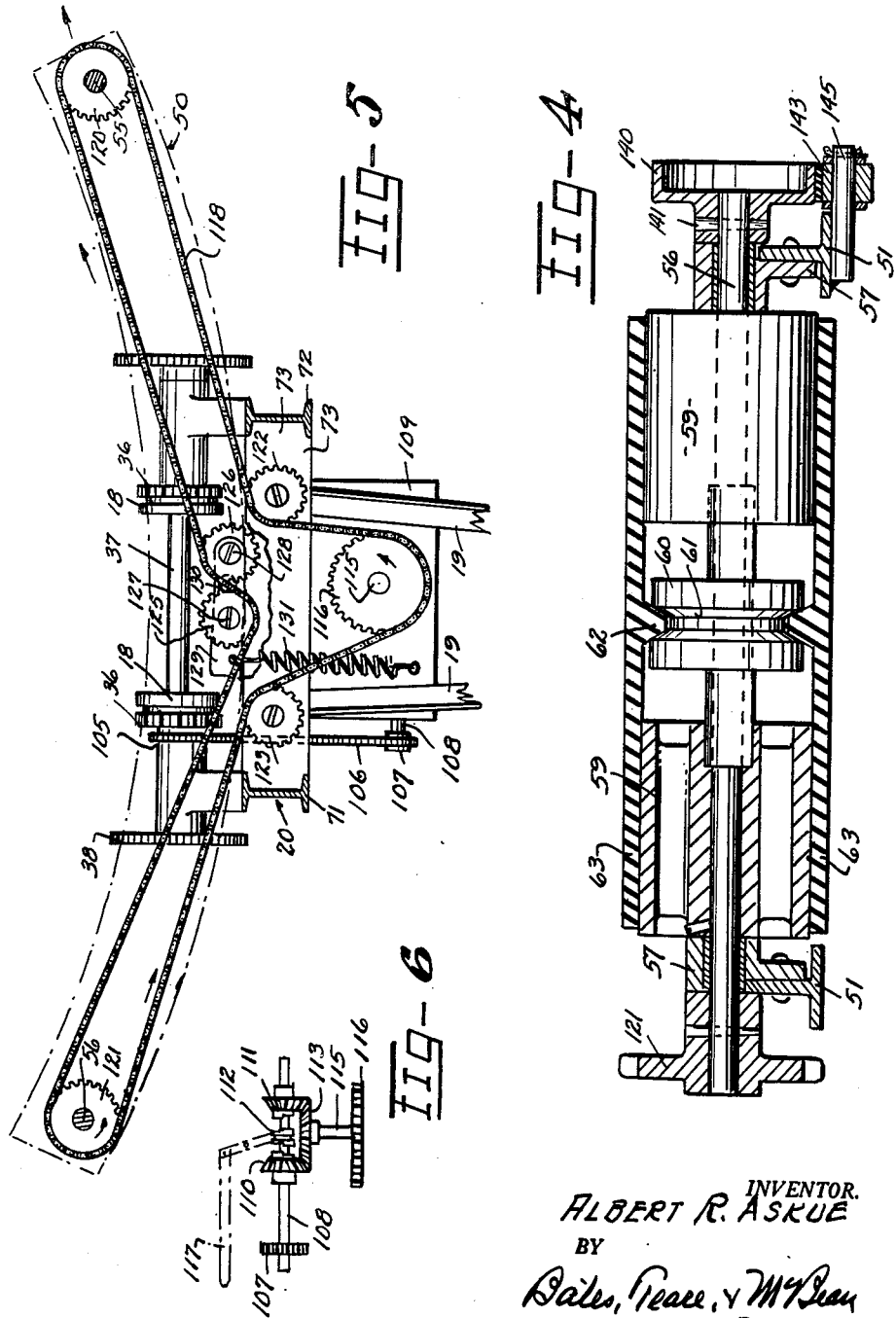
INVENTOR.
ALBERT R. ASKUE
BY
Bates, Teare, & McBean
ATTORNEYS May 27, 1952 A. R. ASKUE 2,598,339
DISCHARGE CONVEYER FOR EXCAVATING MACHINES
Filed July 22, 1949 5 Sheets-Sheet 4
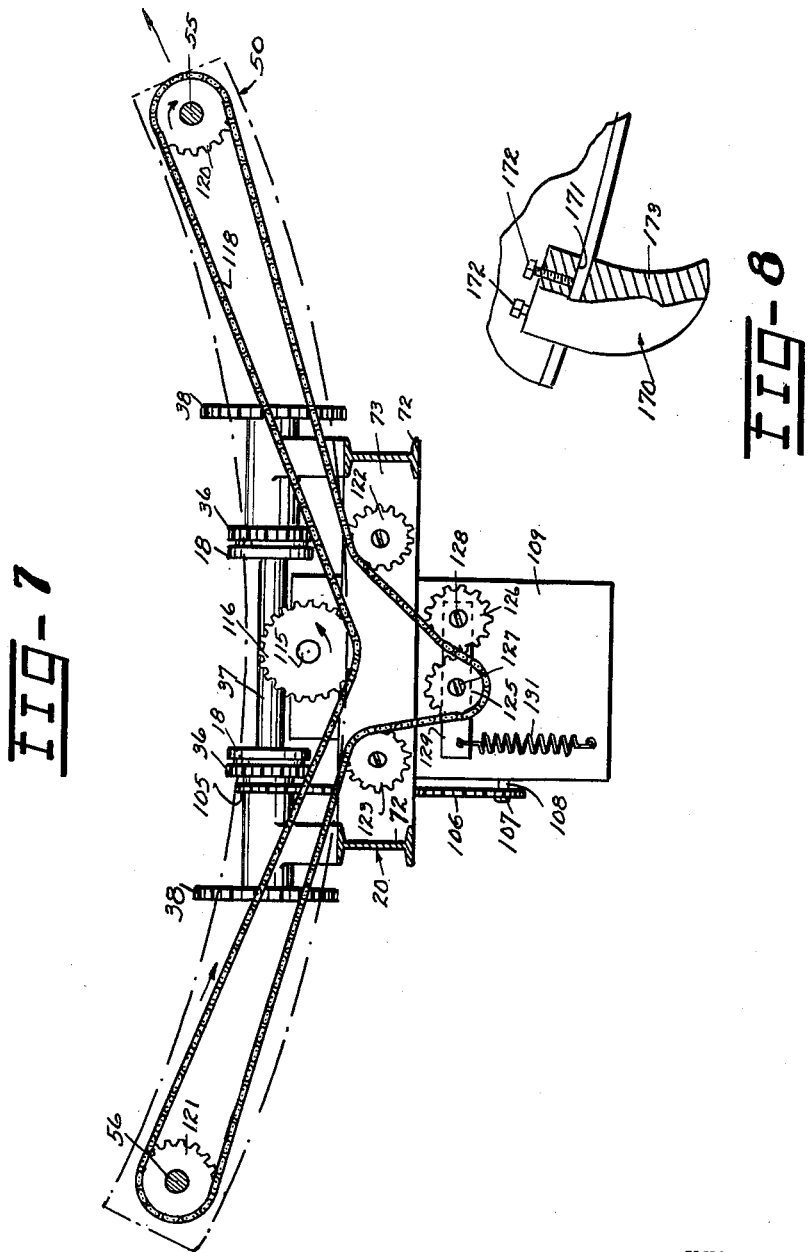
INVENTOR.
ALBERT R. ASKUE
BY
Bates, Teare, McBean
ATTORNEYS May 27, 1952 A. R. ASKUE 2,598,339
DISCHARGE CONVEYER FOR EXCAVATING MACHINES
Filed July 22, 1949 5 Sheets-Sheet 5
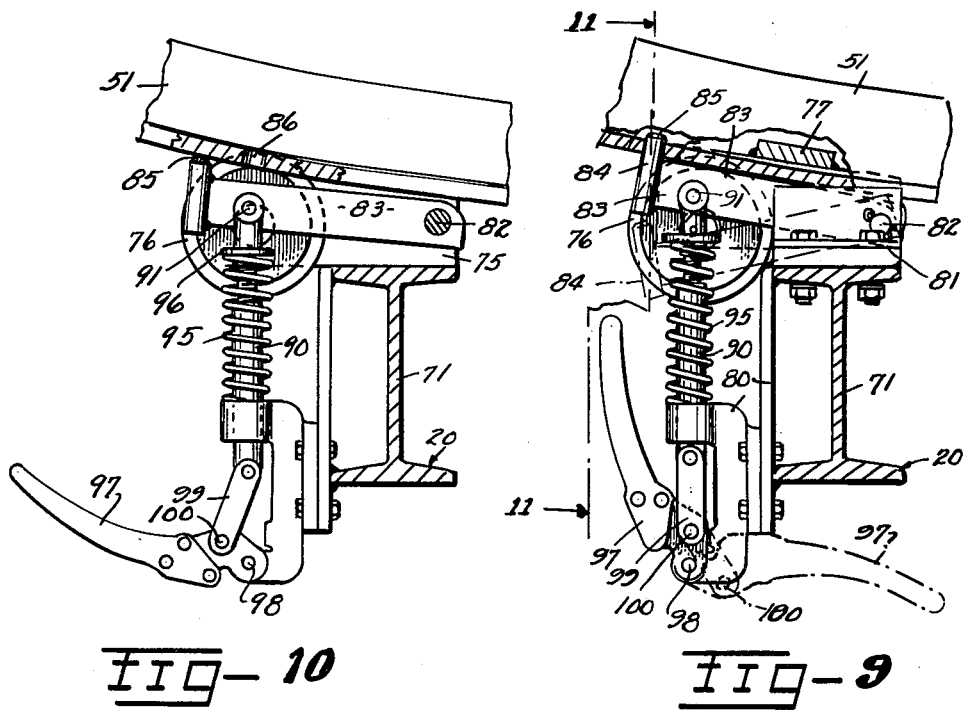
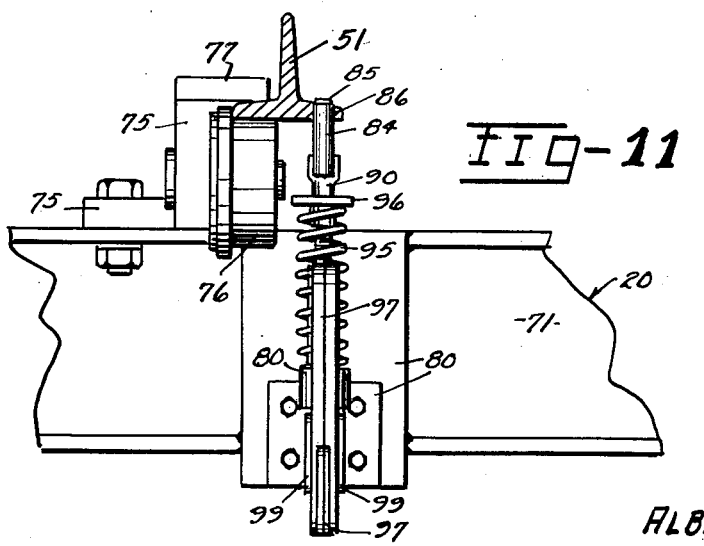
INVENTOR.
ALBERT R. ASKUE
BY
Bates, Teare, & McBean
ATTORNEYS Patented May 27, 1952

2,598,339

UNITED STATES PATENT OFFICE 2,598,339

DISCHARGE CONVEYER FOR EXCAVATING MACHINES

Albert R. Askue, Euclid, Ohio, assignor to The Cleveland Trencher Company, Cleveland, Ohio, a corporation of Ohio Application July 22, 1949, Serial No. 106,216

4 Claims. (Cl. 198—110)

This invention relates to an excavating machine and particularly to a method and apparatus for moving the discharge conveyor thereof transversely of the machine to enable excavated materials to be selectively discharged to either side of the machine as desired. These, therefore, are the general objects of the present invention.

For many years it has been customary to provide a trench excavating machine with a discharge conveyor, such as, for instance, an endless belt extending across the machine in position to receive and discharge excavated materials. Such conveyors have been mounted for transverse movement on a suitable support carried by the machine so that they might be extended outward from the machine toward either side thereof as desired and so control the position of discharged materials. These conveyors have been provided at their opposite ends with drive shafts carrying rollers or drums to drivingly support the endless belt. The belt has been driven by an endless drive chain which has been interconnected between sprocket wheels mounted on respective shafts. A power driven sprocket wheel has been mounted on the support in position to engage one stretch of the chain intermediate the sprockets and so drive the chain. The drive sprocket wheel has been drivingly connected with the power unit of the excavator by a reverse gear mechanism which enabled the driving of the endless belt in either direction.

For many years it has been the general practice to move such conveyors on their supports by either a power or a manually operable drive mechanism. Generally the conveyor frame has been provided with a rack coacting with a pinion carried by a gear housing mounted on the conveyor support and containing a worm gear reduction unit. In manually operable mechanisms the gear reduction unit was provided with an operating crank while in power operated mechanisms it was driven through a suitable reverse gear and clutch mechanism, generally within the gear housing and which was coupled with the power unit of the excavator.

Considerable difficulty has been encountered in the past in connection with the mechanism for shifting the conveyor. Excavated material has collected on the rack and sometimes seriously interferred with, and damaged, the shifting mechanism. This is especially true at the present time because of the demand for a power operated conveyor shifting mechanism. Further, in wheel type excavators, the custom is to pass the conveyor through the excavating wheel. Accordingly, space is at a premium and creates limitations as to the size and position of the conveyor shifting mechanism. While many improvements have been made in such shifting mechanisms they remain a source of trouble in an otherwise rugged and substantially trouble-free excavating machine. Such mechanisms are costly and attempts to improve the same have resulted primarily in increasing the cost without commensurate benefits.

The present invention eliminates the difficulties encountered in the past in connection with such shifting mechanisms by omitting such mechanism in its entirety while retaining its function. I have found that the entire shifting mechanism may be omitted and the conveyor shifted to either side or the other by power as desired by the operator without the addition of substitute mechanism.

I have found that generally when the conveyor shifting mechanism is omitted, the reaction of the forces of the mechanism used to drive the belt conveyor will shift the conveyor. Such forces may be readily controlled and operable at the will of the operator. Such shifting is insured by controlling the forces of friction acting against the driving of the conveyor and the shifting of the conveyor respectively. Thus by constructing the conveyor mechanism so that the frictional resistance which must be overcome by its driving mechanism is greater than the frictional resistance which must be overcome to shift the conveyor bodily on its support, the operation of the conveyor drive mechanism will first operate to shift the conveyor in its support and then operate to drive the conveyor.

The invention together with its objects and advantages will become more apparent from the following detailed description, reference being made to the accompanying drawings.

Figure 2:
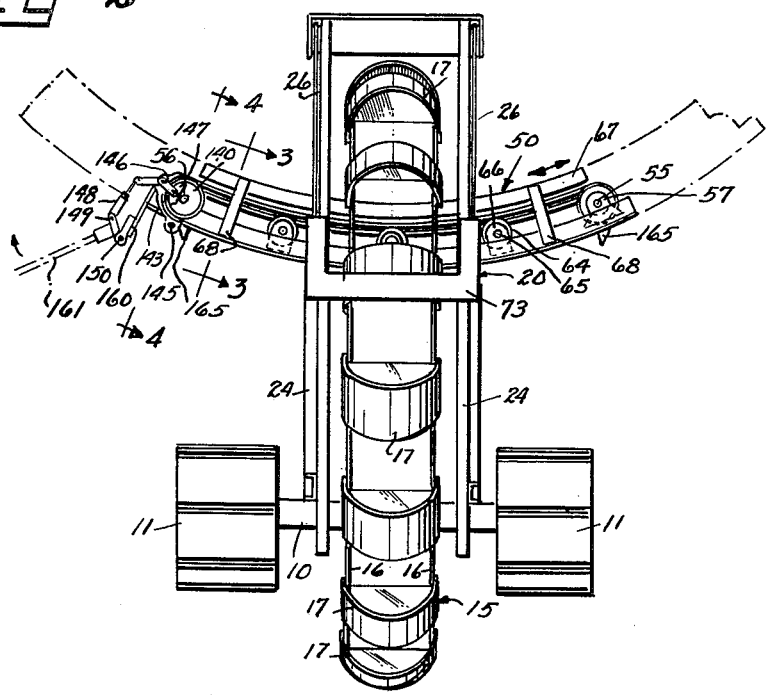
Figure 3:
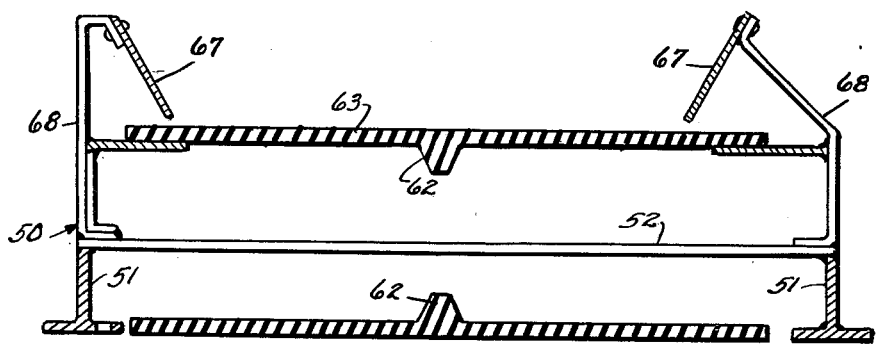

In the drawings, Fig. 1 is a side elevation of a trench excavating machine embodying the present invention; Fig. 2 is a front elevation of the machine; Figs. 3 and 4 are sectional views of the conveyor mechanism, the planes of the sections being indicated by the correspondingly numbered lines on Fig. 2; Fig. 5 is a transverse section illustrating the driving mechanism for the conveyor, the plane of the section being generally indicated by the lines 5—5 in Fig. 1; Fig. 6 is a diagram illustrating a reverse gear mechanism for use in the conveyor driving system; Fig. 7 is a diagram, similar to Fig. 5, but illustrating a more preferred arrangement of the conveyor drive and shifting mechanism; Fig. 8 is a detail, partially in section, of a stop to limit the shifting movement of the conveyor; Fig. 9 is a sectional detail of a self-engaging latch mechanism for interlocking the conveyor to the support, the plane of the section being generally indicated by the lines 9—9 on Fig. 1; Fig. 10 is a view similar to Fig. 9 but illustrating the parts in a different position; and Fig. 11 is a sectional detail as indicated by the lines 11—11 on Fig. 9.

In the drawings there is illustrated a wheel type excavating or ditching machine. As shown in Fig. 1 the machine comprises a frame 10 supported by tractor belts 11. A motor 12 is mounted at one end of the frame, and is connected with the tractor belts by a drive chain 13 and a suitable speed reduction gear mechanism (not shown) but arranged to be controlled manually, as for instance, by an operating lever 14.

The excavator wheel is shown at 15 as comprising a pair of rings 16 joined together at their periphery by U shaped excavating buckets 17. The excavating wheel is supported by a plurality of rollers 18, one pair of which is shown in Fig. 5 as supported by a shaft 37 and others of which are shown in Fig. 1 as supported by a frame structure 19. The shaft 37 and frame structure 19 are both supported by a horizontally extending boom 20. The inner end of the boom is pivotally connected as at 21 to a carriage 22 which is mounted for vertical movement on a mast 24 carried by the forward end of the frame 10.

Cables 26 and 27, secured at one end to winding drums 28 and 29 mounted on the machine frame and at their other ends to the outer and inner ends respectively of the boom 20, as at 30 and 31, serve to control the raising and lowering movement of the excavating wheel 15. The drums 28 and 29 are driven by the motor 12 in any suitable manner, and are selectively controlled, as for instance, by operating levers 32 and 33.

The excavating wheel 15 is driven by the motor 12. This wheel carries a series of pins 35 which coact with sprocket wheels 36 (Figs. 1 and 5) carried by the shaft 37. Also mounted on the shaft 37 and drivingly connected with the sprocket wheels 36 is a sprocket wheel 38. The latter is drivingly connected as by a drive chain 39 with a drive sprocket wheel 40 mounted on a drive shaft 41 carried by the frame and drivingly connected with the motor 12 in any suitable manner. The application of power to the shaft 41 is controlled by a manually operable lever 45.

The drive chain 39 is tensioned by a pair of sprocket wheels 44 carried by a pivoted lever 43 and around which the drive chain 39 is looped. A spring 47 interconnected between the lever 43 and machine frame tensions the driving chain through the medium of the sprockets 44.

This discharge conveyor is generally indicated at 50. This conveyor comprises a pair of spaced elongated arcuate T-rails connected by cross bars, one of which is indicated in Fig. 3 at 52. A transverse shaft 55 is mounted on one end of the conveyor while a similar transverse shaft is mounted at the other end. These shafts are rotatably supported by bearings 58 carried by the rails 51. The shafts 55 and 56 each drivingly carry a pair of belt supporting drums 59. A guide drum 60 is rotatably mounted on each shaft 55 and 56 intermediate its respective drums 59. The guide drums 60 are each provided with an annular groove 61 to engage depending lugs or ribs 62 formed on the under side of an elongated endless conveyor belt 63 which is looped about the drums of the respective shafts. Auxiliary belt supporting rollers 64 are positioned intermediate the ends of the belt as indicated in Fig. 2. The rollers 64 are rotatably mounted on shafts 65 carried by bearings 66 secured to the rails 51. Material is retained on the conveyor by angularly positioned elongated side plates 67 which extend over the top reach of the conveyor belt and are supported from the rails 51 by brackets 68.

As heretofore mentioned, the conveyor 50 is mounted for movement transversely of the frame 10 of the machine. As indicated in Fig. 5, the boom 20 comprises a pair of spaced I-beams 71 and 72, connected by cross frame members 73. Each of the beams 71 and 72 carries a pair of spaced brackets 75. A conveyor supporting roller 76 is journalled on each of these brackets and engages the under side of the rails 51 to support and guide the conveyor frame. Suitable lugs 77, secured to the upper ends of the brackets 75, overlie one of the flanges of the conveyor rail 51 and serve to retain the conveyor seated on the rollers 76.

The conveyor 50 is driven from the shaft 37 which, as heretofore described, is driven by the motor 12. As illustrated in Fig. 5, the shaft 37 is provided with a sprocket wheel 105 which is drivingly connected, as by a drive chain 106, with a sprocket wheel 107 carried by a shaft 108 journalled in a housing 109 secured to the boom 20. The housing 109 is provided with a power transmission unit, including a reverse gear mechanism. As indicated in Fig. 6, such mechanism may comprise a pair of beveled pinions 110 and 111 rotatably mounted on the shaft 108 and selectively coupled therewith by an axially movable clutch 112 which is splined to the shaft 108 between the two pinions. A beveled gear 113, in constant meshing engagement with both pinions 110 and 111, transmits power from the shaft 108 to a drive shaft 115. The drive shaft 115 extends to the exterior of the housing 109 and is provided with a drive sprocket wheel 116 which is connected with the conveyor shafts 55 and 56 heretofore mentioned by an endless drive chain 118. The drive chain 118 is looped about the drive sprocket wheel 116 and a pair of sprocket wheels 120 and 121 which are secured to the conveyor shafts 55 and 56 respectively. A pair of idler sprocket wheels 122 and 123, carried by a cross member 73 of the boom 20, serve to guide the lower reach of the drive chain 118 above the beams 71 and 72 of the boom.

The drive chain 118 is tensioned by a pair of idler sprocket wheels 125 and 126. These sprocket wheels engage opposite faces of the upper reach of the chain 118 and are journalled on pins 127 and 128 carried by an arm 129 which is pivoted as at 130 to the boom 20. A spring 131 interposed between the arm 129 and the housing 109 serves to apply a chain tensioning movement to the sprocket wheels 125 and 126.

A more preferred driving mechanism for the conveyor is illustrated in Fig. 7. For convenience the elements shown in Fig. 7 which correspond substantially to elements shown in Fig. 5 have been designated by identical reference characters, even though they may be located in different positions. In the form of drive shown in Fig. 7, the drive sprocket wheel 116 engages the upper stretch of the drive chain 118 rather than the lower stretch as in Fig. 5 and the tensioning sprocket wheels engage the lower stretch of the chain rather than the upper stretch. Indeed, these are the only material differences between the two structures. A second set of idler wheels, not shown, but similar to the wheels 122 of Fig. 5, may be used to insure sufficient driving contact between the drive chain 118 and the drive sprocket 116. The advantages of the drive of Fig. 7, will hereinafter become more apparent.

The excavating machine thus far described represents one type which has been in general use for some years. In these, and similar machines, another mechanism, not shown in the drawings herein, has been provided to shift the conveyor. Both manual and power operative mechanisms have been provided for this purpose.

One type of conveyor shifting mechanism now in use is manually operated and includes a rack mounted on one or both of the conveyor frame rails 51. Such racks extend the full length of the rails and are engaged by pinions secured to cross shafts which are journalled in bearings carried by the side members 72 of the digging unit supporting boom 20. Such shafts extend longitudinally of the boom members and are driven by a worm gear driving mechanism which is mounted in a case carried by the boom members 71 and 72.

In the manually shiftable conveyors, the worm gear unit is provided with a hand crank for actuation by the machine operator. In later years, complying to the demand by the trade, the conveyors have been shifted by power. In such instances the worm gear reduction unit is drivingly coupled to the power driven shaft 37 (Figs. 1, 5 and 7), by suitable gearing, sprocket wheels and sprocket chains. The worm gear reduction unit includes a selectable reverse gear unit, a clutch unit, and manually operable controls for both of these units. In some instances the reverse gear and clutch units are mounted in a separate housing and are incorporated in the driving connection between the worm gear unit and the power shaft 37.

I have found that all of the driving mechanism formerly used solely for shifting the conveyors whether manual or power operated may be omitted, their functions retained, and the conveyors shifted by power at the will of the operator. This may be accomplished without the use of substitute mechanisms and entirely by utilizing mechanisms now used for other purposes, and without alteration or interference with their present functions.

According to the present invention the conveyor is so constructed that it requires less power to overcome the friction and shift the conveyor than it requires to overcome friction to drive the conveyor belt. Under such conditions, when the conveyor shifting mechanism, the rack, pinions, worm gear drive unit, etc., are omitted and power is applied to the mechanism used to drive the conveyor belt, this mechanism will first shift the conveyor and then drive the conveyor belt. This is accomplished without alteration of or addition to the conveyor belt drive mechanism. Thus the conveyor belt drive mechanism, without change, assumes the function of the discarded shifting mechanism, eliminating the troubles and disadvantages of the shifting mechanisms, reducing the number of parts required, and reducing the cost of the excavating machine.

From inspection of Figs. 5 and 7 it will be seen that when the drive sprocket wheel 116 is rotated in the direction of the arrows indicated in such figures, the stretch of the drive chain 118 which extends between the sprocket wheels 121, 116 will tend to be shortened. This results in a tendency to move the entire conveyor toward the right. The rotation of the sprocket wheel 116 in the reverse direction results in a tendency to shorten the stretch of the conveyor chain which extends between the drive sprocket wheel 116 and the sprocket wheel 120 carried by the conveyor belt supporting shaft 55 at the opposite end of the conveyor, thus reversing the direction in which the conveyor tends to move.

When, in accord with this invention, the frictional forces which must be overcome to drive the conveyor belt and to shift the conveyor, respectively, are so controlled that it requires less power to shift the conveyor than it requires to drive the conveyor belt, then the application of power to the drive sprocket 116 will first shift the conveyor, and when the conveyor is shifted the maximum distance possible, the conveyor belt will be driven in the usual manner. Thus the reaction of the forces used to drive the conveyor belt shifts the conveyor and when the conveyor is shifted as far as possible these reactionary forces are taken care of in the usual manner.

The advantages of the conveyor belt driving mechanism of Fig. 7 will now become apparent. When the drive sprocket wheel 116 coacts with the upper stretch of the conveyor chain 118, and is rotated in the direction of the arrow shown in Fig. 7, it tends to move or shift the conveyor bodily toward the right and also tends to rotate the sprocket wheels 55 and 56 in a clockwise direction. Thus when the frictional forces are controlled as heretofore set out, such rotation will first shift the conveyor to its extreme right hand position and then drive the endless conveyor belt with its upper stretch moving toward the right to thereby discharge excavated material from the side of the machine from which the conveyor has been projected by the preceding shifting movement.

I have described the conveyor as being constructed so that it requires a greater force to drive the conveyor belt than it requires to shift the conveyor. If desired, this force may be measured when the conveyor belt is loaded with a normal load of excavated material. This for all practical purposes results in an efficient operation of the machine.

Suitable stops are provided to limit the movement of the conveyor. These stops may take the form of lugs 165 (Fig. 2) and may be secured to the conveyor rail 51 and may be arranged to engage the boom 20 when the conveyor reaches either extreme limit of its movement. These stops may, however, be adjustably mounted on the conveyor rails 51. An adjustable stop is shown in Fig. 8 as comprising a shoe 170 slotted as at 171 to engage the flange of the conveyor rail and be adjustably secured thereto by any suitable means such as clamping bolts 172. This stop is provided with a downward extending ear 173 which is arranged to engage the conveyor supporting rollers 76 and thus prevent further shifting movement of the conveyor.

In Figs. 9 to 11 inclusive, I have shown another form of conveyor stop. This stop comprises a latch mechanism which retains the conveyor in any one of a series of adjusted positions. As shown, a bracket 81 is mounted on the beam 71 of the boom 20 and is provided with a pivot pin 82 on which an arm 83 is pivotally mounted. A latch pin 84 is secured to the outer end of the arm 83 and has its upper end tapered, as at 85, to enable it to readily enter one of a series of openings 86 formed in the flange of the associated conveyor rail 51.

The latch arm 83 is retained in the locking position, shown in Fig. 9, by a spring pressed plunger 90. This plunger is mounted for vertical movement in the bracket 80 which is secured to the beam 71, and is pivotally connected with the arm 83 as at 91. Sufficient clearance is provided between the pivot 91 and the arm to permit free movement of the arm about the axis of its pivot 82. A spring 95 encircles the plunger 90 and is disposed between the bracket 80 and a suitable collar 96 which is secured to the plunger 90.

The latch pin 84 is manually withdrawn from engagement with the conveyor rail 51. As shown in Figs. 9 and 10 an operating lever 97 is pivotally connected at 98 with the bracket 80, and is connected with the plunger 90 by a link 99. When the lever 97 is moved from the full line position to the dotted line shown in Fig. 9, the pivot 100 between the lever 97 and the link 99 will have moved from one side of the center of the plunger 90 to the other side thereof, whereupon the spring 95 tends to swing the lever 97 in a counter-clockwise direction. This movement of the lever 97 is limited by its engagement with the bracket 80 before the latch moves to reengage the rail 51 and thus retain the latch in an unlatched position. The latch may be manually released from the unlatched position whereupon the parts will assume the position shown in Fig. 10. When the parts are in this position, the spring 95 serves to maintain the pin 84 in frictional engagement with the rail 51 of the conveyor 50 until such time as an opening 86 in the conveyor rail is aligned with the pin 84, whereupon the spring will force the pin into engagement with such opening, thereby latching the conveyor in position on the boom.

When the latch is released the frictional resistance, inherent in the movement of the belt 63, the belt supporting drums 59, and the associated parts provides sufficient reactive force to cause the desired lateral movement of the conveyor when power is applied to the sprocket 116. This reactive force is increased when the conveyor is loaded with excavated material, both from added friction and from the inertia of the mass of the excavated material.

In some types of excavating machines, the reactive force due to inherent frictional resistance may be found to be insufficient to restrain the rotation of the conveyor belt drive shafts 55 and 56 so as to cause the desired movement of the conveyor. In such machines the frictional forces may be controlled by providing a constantly acting brake to one of the conveyor belt shafts 55 or 56. However, under such conditions I prefer to provide a manually operable brake to prevent rotation of the shaft 56.

One form of brake mechanism which may be used to stop the rotation of the conveyor shaft 56 is shown in Figs. 1 and 4. As there indicated, a brake drum 140 is secured to the outer end of the conveyor shaft 56 as by a pin 141. A brake shoe 143 is pivotally mounted on a pin 145 which is secured, as by welding, to the adjacent conveyor rail 51. This brake shoe extends upwardly around the drum 140 as indicated in Fig. 2 and is pivotally connected by a lever 146 with an internal brake shoe 147. The lever 146 is connected with one link 148 of a toggle mechanism, the other link 149 of which is pivoted as at 150 to a bracket 160 carried by the conveyor frame. A disengageable operating arm 161 may be provided to facilitate manual operation of the toggle. This toggle is of such a type that, when it has been moved past dead center in the direction of the arrow shown in Fig. 2, the brake is held in a released position. When the toggle is in the position shown in Fig. 2, the weight of the operating arm 161 is sufficient to retain the brake active to restrain the shaft 56 from rotation.

From the foregoing description it will be seen that I have provided a very simple method and apparatus for shifting the discharge conveyor of an excavating machine, which entirely eliminates the independent shifting mechanisms used in the past, and utilizes instead, without alteration, the mechanism formerly used only to drive the conveyor. Thus while omitting an expensive drive mechanism and the difficulties encountered by its use, I have retained its function by transferring such function to an existing mechanism formerly used solely for another function, and I have accomplished this without changing the latter mechanism or detracting from its operation in connection with its former function.

I claim:

1. A discharge mechanism for an excavating machine or the like comprising, a support, a discharge conveyor mounted on said support for movement transversely thereof, said conveyor including spaced belt supporting means, an endless belt looped about said means and having its upper stretch positioned to receive material to be discharged, a sprocket wheel drivingly connected to each of said belt supporting means, a drive sprocket wheel mounted on said support, an endless drive chain interconnecting said first named sprocket wheel and having its upper stretch engaged by said drive sprocket wheel, power operated means to drive said drive sprocket wheel, a releasable means to secure said conveyor to said support, and a selectively operable brake mechanism connected with one of said belt supporting means to hold the same against rotation, whereby consequent upon release of said releasable means the rotation of the driving sprocket will move said conveyor transversely of its support.

2. A discharge mechanism for an excavating machine or the like, including a support, a frame mounted on said support for movement transversely thereof, means on said frame to receive and discharge material, a pair of drive shafts journalled on respective ends of said frame and drivingly connected to actuate said means, a sprocket wheel secured to each of said shafts, a drive sprocket wheel mounted on said support, an endless drive chain interconnecting said sprocket wheels, power means to rotate said third sprocket wheel, manually operable means to determine the direction of such rotation, a manually releasable latch to latch said conveyor to said support, and a brake connected with one one of said shafts to hold the same against rotation, manually operable means to selectively actuate said brake whereby consequent upon release of said latch rotation of the driving sprocket and application of said brake will result in movement of said frame transversely of the support, and means to limit the movement of said frame.

3. A discharge mechanism for an excavating machine or the like comprising a support, a discharge conveyor movably mounted on said support, said conveyor comprising a frame, a belt supporting and driving roller at each end of said frame, an endless conveyor belt looped about said rollers, a pair of sprocket wheels drivingly connected to respective rollers, a third sprocket wheel mounted on said support, an endless drive chain interconnecting said sprocket wheels, power operated means to drive said third sprocket wheel, a manually releasable latch to latch said conveyor to said support, and a selectively operable brake mechanism coacting with one of said first named sprocket wheels to hold the same against rotation whereby consequent upon release of said latch the rotation of the driving sprocket will move said conveyor transversely of said support, and means to limit the movement of said conveyor in either direction.

4. A discharge mechanism for an excavating machine, including a support, a discharge conveyor mounted on said support for movement transversely thereof, means on said conveyor to receive material to be discharged and discharge it to one side of the support, said conveyor comprising a frame, a pair of spaced shafts journalled on said frame, a belt supporting and driving roller mounted on each shaft, an endless flexible conveyor belt looped about said rollers, a pair of sprocket wheels drivingly connected to respective shafts, a third sprocket wheel mounted on said support, said sprocket wheels being positioned in a common plane with the axis of the third wheel in a plane normal to the first named plane and between the axes of the first named wheels, an endless drive chain drivingly interconnecting said sprocket wheels, power operated means to drive said third sprocket wheel including a manually operable reverse gear mechanism, a releasable latch to latch said conveyor to said support, resilient means to move said latch in a latch engaging position, means to lock said latch in a latch disengaging position, and a manually operable brake mechanism coacting with one of said shafts to selectively hold such shaft against rotation, said latch comprising a pin, and said conveyor having a plurality of openings to receive said pin, and means carried by said conveyor and engageable with said support to limit the movement of said conveyor in either direction.

ALBERT R. ASKUE.

REFERENCES CITED

The following references are of record in the file of this patent:

UNITED STATES PATENTS

| Number | Name | Date |
|---|---|---|
| 769,947 | Kramer | Sept. 13, 1904 |
| 778,561 | Wixcel | Dec. 27, 1904 |
| 833,456 | Goodfellow | Oct. 16, 1906 |
| 1,056,105 | Krupp | Mar. 18, 1913 |
| 1,086,522 | Gilman | Feb. 10, 1914 |
| 1,892,525 | George et al. | Dec. 27, 1932 |
| 2,259,659 | Penote et al. | Oct. 21, 1941 |
| 2,536,412 | Bamford | Jan. 2, 1951 |